United States Patent [19]

Sherman

[11] Patent Number: 4,998,956
[45] Date of Patent: Mar. 12, 1991

[54] SKI AND SNOWBOARD SHARPENER

[76] Inventor: Frederick R. Sherman, 525 Willard, Pocatello, Id. 83201

[21] Appl. No.: 544,634

[22] Filed: Jun. 27, 1990

[51] Int. Cl.$^5$ .................. B21K 17/00; B23D 67/12
[52] U.S. Cl. .................................. 76/83; 29/80
[58] Field of Search .................. 76/83, 88, 82, 82.1, 76/82.2; 51/205 WG, 214; 29/79, 78, 80; D8/91, 93; 280/809

[56] References Cited

U.S. PATENT DOCUMENTS

| | | | |
|---|---|---|---|
| D. 295,142 | 4/1988 | Patrick | D8/91 |
| 3,670,601 | 6/1972 | Weeks | 76/83 |
| 4,241,624 | 12/1980 | Strojny | 76/83 |
| 4,280,378 | 7/1981 | Levine | 76/83 |

*Primary Examiner*—Roscoe V. Parker
*Attorney, Agent, or Firm*—Brady, O'Boyle & Gates

[57] ABSTRACT

A molded plastic cylindrical housing has an axially extending quadrant opening and includes a recess extending axially in the housing and in the vertical and horizontal right angle guide surfaces of the quadrant opening, with the recess being in communication with the quadrant opening. A file having a plurality of vertically and horizontally disposed coarse teeth at right angles to each other is mounted on a peripheral shoulder in the recess that slopes upwardly from one end of the shoulder to the other so the coarse teeth of the file slope upwardly from one end of the sharpener to the other, from a position at the end of the sharpener in the direction of the sharpening movement where the coarse teeth are below or flush with the right angle guide surfaces, and progressively extend outwardly from the guide surfaces to a position at the other end of the file where the coarse teeth protrude approximately 0.015" from the vertical and horizontal right angle guide surfaces, whereby the metal edge of a ski or snowboard is guided by said guide surfaces into smooth engagement with the progressively protruding right angle coarse teeth for smoothly drawing a sharp edge thereon.

7 Claims, 2 Drawing Sheets

SKI AND SNOWBOARD SHARPENER

CROSS-REFERENCE TO RELATED APPLICATION

The sharpener disclosed in the instant application is an improvement on the sharpener disclosed in pending Design application Ser. No. 07/105,692, filed Oct. 8, 1987, by Frederick R. Sherman, one of the inventors named herein.

BACKGROUND OF THE INVENTION

Various sharpeners have been proposed for normally sharpening or honing the vertical and horizontal metallic surfaces of a ski edge. These types of sharpeners are disclosed in U.S. Pat. Nos. 3,670,601, dated June 20, 1972; 4,280,378, dated July 28,1981; and Design patent application Ser. No. 295,142, dated Apr. 12, 1988. While these sharpeners have been satisfactory for their intended purpose, some have not, and because of their constructions their effectiveness in sharpening the ski edge depended upon the dexterity or the expertise of the person using the sharpener, so as not to damage the ski edge during the honing operation.

The expense of today's skis and snowboards necessitates the availability of a sharpener which can be easily manipulated by an inexperienced person to effectively and easily sharpen the vertical and horizontal metallic surfaces of a ski or snowboard edge without fear of gouging or permanently damaging the ski edge.

SUMMARY OF THE INVENTION

After considerable research and experimentation, the ski and snowboard sharpener of the present invention has been devised which can be used by an inexperienced person to smoothly and expertly simultaneously sharpen the vertical and horizontal metallic surfaces of a ski edge, or snowboard edge, and comprises, essentially a molded plastic cylindrical hollow housing having an arcuate side wall and planar end walls, an axially extending recess is provided in the housing, and an axially extending quadrant opening is provided in the arcuate side wall and end walls communicating with the axially extending recess. The respective portions of the arcuate wall and end walls adjacent the quadrant opening provide vertically and horizontally disposed surfaces. An axially extending file is mounted in the recess and is formed with a plurality of vertically and horizontally disposed coarse teeth, at right angles to each other, surrounded by the vertically and horizontally disposed surfaces, respectively, of the housing walls adjacent the opening. The recess in which the file is mounted, is constructed and arranged to provide a slight slope, extending axially from one end of the recess to the other, whereby the coarse teeth on one end of the file extend below or flush with the respective vertically and horizontally disposed surfaces of the housing walls adjacent the opening, and the teeth toward the opposite end of the file progressively extend outwardly from the respective vertically and horizontally disposed surfaces of the housing walls adjacent the opening, whereby the vertically and horizontally disposed surfaces adjacent the opening on the first mentioned end of the file function to guide the sharpener on the vertical and horizontal metallic surfaces of a ski or snowboard edge, and the progressively outwardly extending teeth toward the opposite end of the file engage the respective surfaces of the ski or snowboard edge to be sharpened. By this construction and arrangement, there is a gradual or progressive engagement of the file teeth with the surfaces to be sharpened, rather than an abrupt or grabbing engagement; which would be the case if all of the file teeth extended an equal distance outwardly from the vertically and horizontally disposed surfaces of the housing walls adjacent the opening, as they do in the mentioned prior art, resulting in a less than smooth sharpening operation or stroke, with chattering at times between the sharpener and the metal edge being sharpened, and sometimes abrupt grabbing and stopping of the sharpening stroke.

DESCRIPTION OF THE PREFERRED EMBODIMENT

Figure 1A:
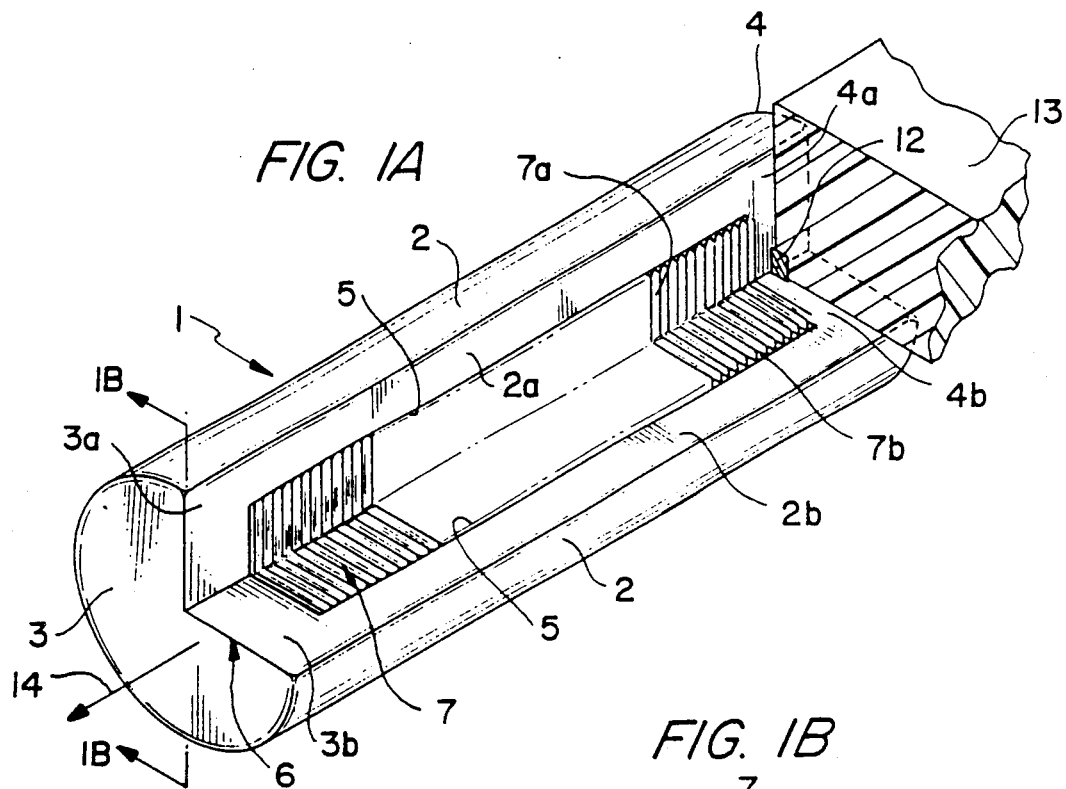
FIG. 1A is a perspective view of the sharpener of the invention shown being used to sharpen a ski edge, shown in cross-section.
Figure 1B:
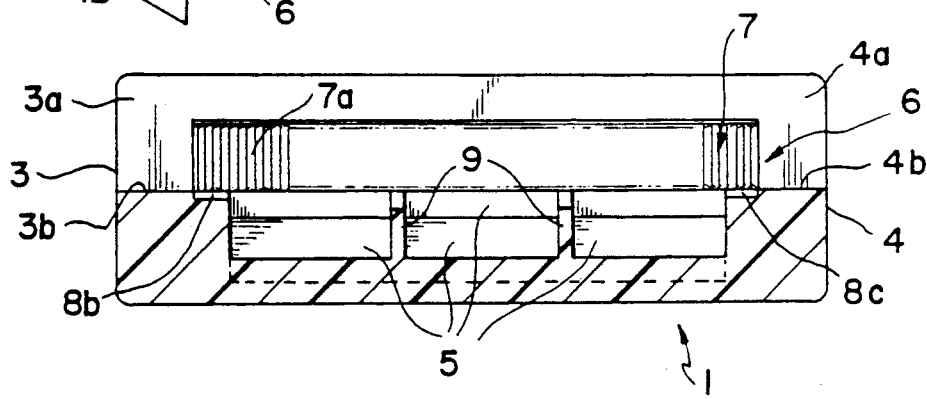
FIG. 1B is a longitudinal section view, partly in side elevation, taken along line 1B—1B of FIG. 1A and FIG. 5.
Figure 2:
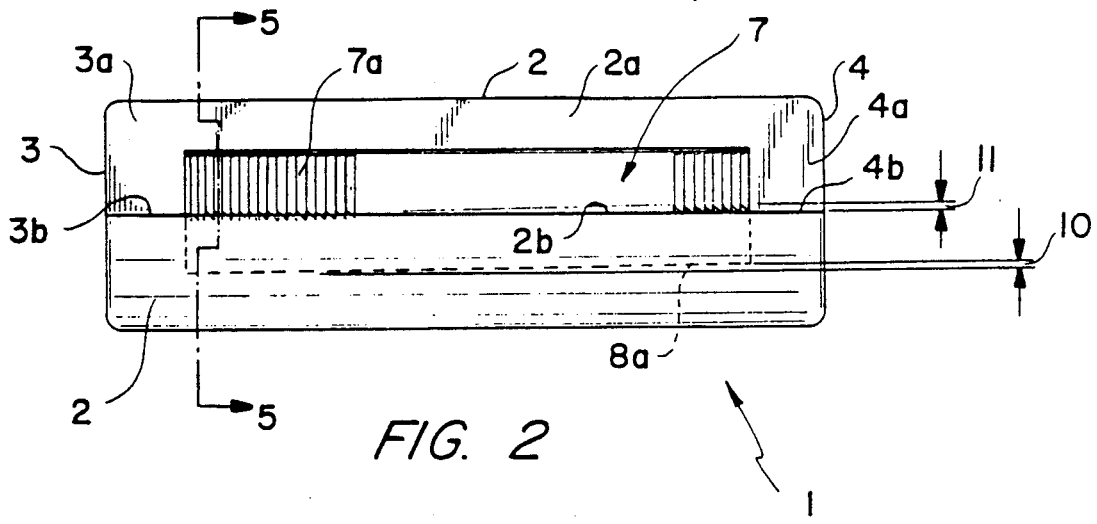
FIG. 2 is a side elevational view of the sharpener.

Referring to the drawings in more detail, and more particularly to FIGS. 1 and 2, the ski and snowboard sharpener of the present invention comprises a molded plastic cylindrical hollow housing 1 having an arcuate side wall 2 and planar end walls 3 and 4. An axially extending recess 5 is provided in the housing 1, and an axially extending quadrant opening 6 is provided in the arcuate side wall 2 and end walls 3 and 4 communicating with the axially extending recess 5. The portions of the arcuate wall 2 and end walls 3 and 4 adjacent the quadrant opening 6 provide vertically disposed surfaces 2a, 3a and 4a; and horizontally disposed surfaces 2b, 3b and 4b, respectively, at right angles to each other.

An axially extending file 7 is mounted in the recess 5, and is formed with a plurality of vertically and horizontally disposed coarse teeth 7a and 7b, respectively, at right angles to each other, surrounded by the vertically and horizontally disposed surfaces 2a, 3a, 4a; and 2b, 3b and 4b.

Figure 3:
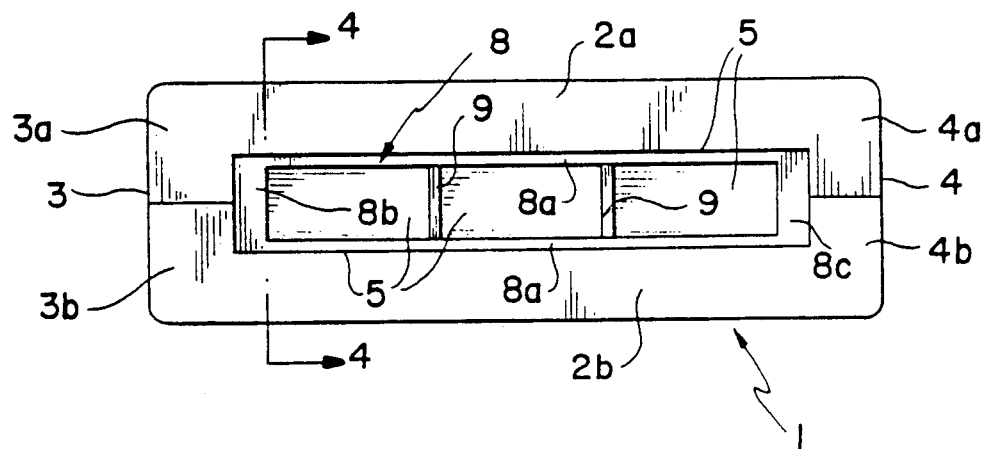
FIG. 3 is a top elevational view of the sharpener housing with the file removed therefrom.
Figure 4:
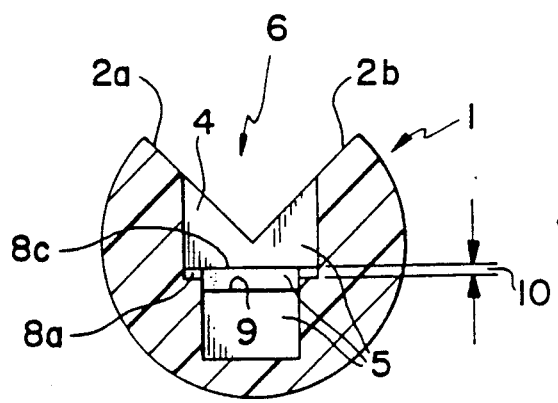
FIG. 4 is a cross-sectional view taken along line 4—4 of FIG. 3.

As will be seen in FIGS. 3 and 4, the recess 5 is provided with a peripheral shoulder 8 having axially extending portions 8a and transversely extending end portions 8b and 8c. Transversely extending reinforcing ribs 9 are also provided in the recess below the peripheral shoulder 8. The peripheral shoulder 8 is sloped, as shown at 10, slightly upwardly from the end portion 8b to the end portion 8c, whereby the peripheral shoulder end portion 8b near the end wall 3 of the housing, is further below the surfaces 3a, 3b than the end portion 8c at the opposite end near the end wall 4, is below the surfaces 4a, 4b.

Figure 5:
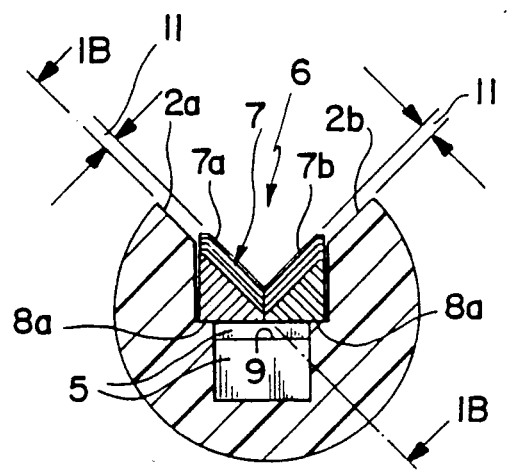
FIG. 5 a cross-sectional view taken substantially along line 5—5 of FIG. 2, but oriented the same as FIG. 4.

The details of the construction of the file 7 are shown in FIG. 5, wherein a pair of longitudinally extending file components 7a, 7b, each constructed from bar stock having a substantially triangular cross-sectional configuration and milled along the hypotenuse to form coarse teeth, are supported on the recessed peripheral shoulder 8 in side by side relation, and are secured thereon by a suitable adhesive (not shown).

As will be seen in FIGS. 2 and 5, the slope 10 of the peripheral shoulder 8 will result in the portion of the file 7 adjacent the end wall 4 to extend outwardly from the adjacent wall surfaces 2a, 2b, 4a and 4b by a distance 11, equal to the slope 10, and this distance is in the range of 0.011 to 0.017 inch, and preferably, 0.015 inch, while the teeth on the file adjacent the end wall 3 extend below or flush with the adjacent wall surfaces 2a, 2b, 3a, 3b. The teeth of the file components are thus disposed on a slope from one end to the other, whereby on the leading end in the direction of movement for the sharpening stroke, the first tooth or two of each file component 7a, 7b is below or flush with the guide surfaces 3a, 3b in the quadrant opening 6, and on the opposite end they protrude 0.015 inch from the surrounding surfaces. The file teeth thus slope from 0–0.015 inch in the sharpener relative to the plane of the quadrant opening surface.

In use, the sharpener is positioned, as shown in FIg. 1a, adjacent the metal edge 12 of a ski or snowboard 13. The sharpener is started at the end of the edge 12 and moved axially therealong in the direction of the arrow 14, that is, the cutting or honing direction of the file teeth. Since the surface portions 2a, 2b, 3a and 3b adjacent the end wall 3 are the first to engage the end of the edge 12, and the adjoining surfaces of the ski or snowboard, there is a mere guiding of the sharpener onto the edge 12 and no initial sharpening, since the teeth on the portion of the file 7 adjacent the end wall 3 are below or flush with the surface portions 2a, 2b, 3a and 3b. As the sharpener is slid along the edge 12, the file teeth will progressively engage the ski edge 12 to sharpen the edge, whereby the ski or snowboard edge 12 can be easily sharpened with a smooth guided stroke without fear of gouging the edge. Thus, the slope to the protruding teeth on the two cutting files produces a dual broach effect on the ski or snowboard edge and draws the metal to a razor sharp edge, and renders the sharpener easier to mass-produce and still provide a sharpener that is easier to start and which retains good metal engagement with the edge being sharpened.

As previously stated, the file teeth are coarse teeth, thus making them strong, durable and substantially self-cleaning, with the perpendicular wall of each tooth facing toward the sharpening movement direction of the sharpener. It has been found that efficiently operating cutting teeth on the files, for example, are spaced from each other approximately 0.061 inch, have a perpendicular wall height of approximately 0.140 inch, with the slope of the back of each tooth facing away from the cutting direction being substantially 45°. Since the teeth are so coarse, the filings from the sharpened metal edge are in powder form and do not clog the teeth, and can be easily removed therefrom by either shaking the sharpener, or blowing the filings therefrom. At intervals a stiff brush can be used to clean debris from the file teeth.

It is to be understood that instead of molding the shoulder 8 with the mentioned slope 10, the shoulder can be molded square in the recess 5 relative to the housing 1, and the bottom surfaces of the file components 7a and 7b that rest on the shoulder can be ground to provide the required slope to the teeth protruding from the adjoining surfaces in the quadrant 6 of the housing 1.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A sharpener for sharpening the vertical and horizontal metallic edge surfaces of a ski or snowboard edge comprising an elongated housing having a side wall and end walls, an axially extending quadrant opening provided in said side wall and end walls, an axially extending recess in said housing in said quadrant opening and communicating with the quadrant opening, the portions of the side wall and end walls adjacent the quadrant opening providing vertical and horizontal guiding surfaces in the quadrant opening for the ski edge, and a file mounted in said recess, said file having vertically and horizontally disposed teeth portions, the teeth portions on one end of the file extending no further than the vertical and horizontal guiding surfaces at said one end of the file, the teeth portions toward the opposite end of the file extending progressively further outwardly from the adjacent vertical and horizontal guiding surfaces, whereby the vertical and horizontal surfaces at said one end of the file guide the sharpener on the edge to be sharpened, while the progressively protruding teeth toward the opposite end of the file engage the edge to be sharpened.

2. A sharpener according to claim 1, wherein a peripheral shoulder is provided on the side and end walls of said recess, said peripheral shoulder being sloped from one end of said recess to the other, and said file being mounted on said shoulder.

3. A sharpener according to claim 1, wherein the teeth at the opposite end of the file extend substantially 0.015" outwardly from the adjacent vertical and horizontal guiding surfaces.

4. A sharpener according to claim 1, wherein the teeth at the opposite end of the file extend outwardly from the adjacent vertical and horizontal guiding surfaces in the range of 0.011"–0.017".

5. A sharpener according to claim 1, wherein the file comprises a pair of file components constructed from bar stock having a triangular cross-sectional configuration, said bar stock being milled along the hypotenuse surface to form coarse file teeth.

6. A sharpener according to claim 5, in which said coarse file teeth on each file component are normal to the axis of the file component.

7. A sharpener according to claim 1, including a peripheral shoulder on the side and end walls of said recess at a medial portion of the depth of the recess, and said file rigidly mounted on said shoulder.

* * * * *